United States Patent [19]

Dalton et al.

[11] 3,991,136
[45] Nov. 9, 1976

[54] METHOD OF PRODUCING ABS POLYBLENDS HAVING A LOW RESIDUAL MONOMER CONTENT

[75] Inventors: William O. Dalton, Hampden; Fred M. Peng, Longmeadow, both of Mass.

[73] Assignee: Monsanto Company, St. Louis, Mo.

[22] Filed: Apr. 2, 1975

[21] Appl. No.: 564,516

[52] U.S. Cl. ............................................. 260/880 R
[51] Int. Cl.$^2$ .......................................... C08L 9/06
[58] Field of Search ................................. 260/880 R

[56] References Cited

UNITED STATES PATENTS

| | | | |
|---|---|---|---|
| 3,448,175 | 6/1969 | Doak | 260/880 R |
| 3,463,833 | 8/1969 | Isogawa | 260/880 R |
| 3,515,774 | 6/1970 | Lee | 260/880 R |
| 3,627,855 | 12/1971 | Schott | 260/880 R |
| 3,657,391 | 4/1972 | Curfman | 260/880 R |
| 3,671,607 | 6/1972 | Lee | 260/880 R |

*Primary Examiner*—Paul R. Michl
*Attorney, Agent, or Firm*—Joseph S. Nelson; William J. Farrington; James C. Logomasini

[57] ABSTRACT

An improved process for preparing ABS polyblends, the steps comprising, polymerizing a polymerizable mixture of a monomer formulation and a diene rubber forming a grafted copolymer and a matrix interpolymer, the improvement comprising, polymerizing said monomer formulation to at least about 90% conversion, charging a third monomer and further polymerizing said monomer formulation in the presence of said third monomer to convert essentially all of said monomer formulation to interpolymer followed by recovering said polyblend having a low residual monomer content.

21 Claims, No Drawings

METHOD OF PRODUCING ABS POLYBLENDS HAVING A LOW RESIDUAL MONOMER CONTENT

BACKGROUND OF THE INVENTION

Processes have been developed for the manufacture of ABS polyblends having desirable toughness and other physical properties. Such processes have had problems in producing polyblends having a low residual unpolymerized monomer content. In particular, the styrene type monomers are highly soluble in the polyblend and have a high boiling point, hence, are difficult to remove from the finished polyblend. Prior art processes have used stripping methods in emulsion polymerization or devolatilization methods in mass polymerization which are costly and fail to reduce the residual monomers to a level acceptable for many uses. Hence, it is the objective of the present invention to provide a process wherein residual unpolymerized monomers, particularly the styrene type which polymerize slowly at high conversions, can be readily converted into interpolymers, negating the need for costly stripping and devolatilization steps for removal of the monomer and their subsequent recovery for ecology reasons.

Another objective is to provide a facile and relatively economical process for preparing such rubber-interpolymer polyblends which permits utilization of existing equipment and techniques for preparation of the grafted rubber components thereof.

Other related objectives and advantages will be readily apparent from the following detailed specification.

SUMMARY OF THE INVENTION

It has now been found that the foregoing and related objectives may be readily attained in an improved process of the present invention, the steps comprising:
  A. polymerizing a polymerizable mixture comprising a monomer formulation, a molecular weight regulator and a prepolymerized graftable rubber containing a diene monomer component, to graft at least a portion of the polymerizing monomers as superstrate interpolymer on said rubber as a rubber substrate to provide a graft copolymer, said monomer formulation consisting at least principally of a monovinylidene aromatic hydrocarbon and an ethylenically unsaturated nitrile, forming during polymerization thereof, an ABS polyblend of said graft copolymer and a matrix interpolymer, the improvement comprising:
  B. charging a third monomer selected from the group consisting of vinyl acetate, acrylate esters, methacrylate esters, acrylic acid, methacrylic acid and mixtures thereof to said polymerizable mixture in step (A) after polymerizing at least about 90% by weight of said monomer formulation, said third monomer being charged in an amount equivalent to at least about 50% by weight of the unpolymerized monomer formulation,
  C. further polymerizing said monomer formulation in the presence of said third monomer so as to convert essentially all of said monomer formulation to interpolymer, and
  D. recovering said polyblend from said polymerizing mixture and drying said polyblend to remove essentially all residual monomers.

PREFERRED EMBODIMENTS

The Interpolymer

The interpolymers of the present invention of both the matrix and the graft superstrates consist at least principally of a monovinylidene aromatic hydrocarbon and an ethylenically unsaturated nitrile, i.e., such monomers comprise at least 50.0 percent by weight and preferably at least 75.0 percent by weight of the interpolymers. Most desirably, such monomers comprise at least 90.0 percent by weight of the interpolymer and the usual commercial compositions are substantially completely comprised of such monomers although minor amounts, i.e., less than 5.0 percent by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interpolymers closely approximate the chemical composition of the interpolymer of the matrix so as to obtain matching of the chemical properties. In addition, it is believed that increased chemical bonding is thereby obtained with commensurate improvement in chemical properties. Moreover, by close matching of certain interpolymers used in the matrix and superstrate such as those containing acrylate, it is possible to obtain a high degree of translucency and substantial transparency. However, it will be appreciated that deviations in the composition of the interpolymers of the matrix and superstrates such as different monomers and/or ratios may be desirable for some applications and that some deviations may inherently occur as the result of process variables.

Exemplary of the monovinylidene aromatic hydrocarbons which may be used in the interpolymers are styrene; alphaalkyl monovinylidene monoaromatic compounds, e.g., alpha-methlstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrene, e.g., o-chloro- styrene, p-chlorostyrene, o-bromostyrene, 2,4-dichlorostyrene, etc.; ring-alkyl, ring-halosubstituted styrenes, e.g., 2-chloro- 4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the ethylenically unsaturated nitriles which may be used in the interpolymers are acrylonitrile, methacrylonitrile, ethacrylonitrile, and mixtures thereof.

Exemplary of the monomers which may be interpolymerized with the monovinylidene aromatic hydrocarbons and unsaturated nitriles are conjugated 1,3-dienes, e.g., butadiene, isoprene, etc.: alpha- or beta-unsaturated monobasic acids or derivatives thereof, e.g., acrylic acid, methyl acrylate, ethyl acrylate, butyl acrylate, 2-ethylhexyl acrylate, methacrylic acid and the corresponding esters thereof: acrylamide, methacrylamide; vinylidene chloride, vinylidene bromide, etc.; vinyl esters such as vinyl acetate, vinyl propionate, etc., dialkyl maleates or fumarates such as dimethyl maleate, diethyl maleate, dibutyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preferred polymer of a partially polymerized material such as a partially polymerized monovinylidene aromatic hydrocarbon or interpolymer thereof.

The polymerizable monomer mixtures contain at least 20 percent by weight of the monovinylidene aromatic monomer and preferably at least 50 percent by weight thereof. They also contain at least 5 percent by weight of the unsaturated nitrile and preferably at least 10 percent by weight thereof. From the standpoint of highly advantageous commercial practice in producing ABS polyblends, the monomer formulations contain 20 to 95 percent, and preferably 60 to 85 percent, by weight of the vinylidene aromatic hydrocarbon and 80 to 5 percent, and preferably 40 to 15 percent, by weight of the unsaturated nitrile.

The Matrix

As is well known in the art, the polyblend is produced by polymerizing the monomers in the presence of the preformed rubber. It is generally believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100 percent grafting efficiency normally is approached only at ratios of monomers to substrate of below about 0.3:1, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber, and the conditions of polymerization. Generally, interpolymers prepared without the inclusion of rubber will be compounded with material from the graft polymerization reactions to obtain the desired composition.

Any of the usual polymerization processes may be used to effect polymerization of the ungrafted superstrate, i.e., mass suspension and emulsion, or combinations thereof. Such techniques are well known and are also described herein with respect to the graft copolymerization reactions.

The Rubber Substrate

Various rubbers onto which the interpolymer may be grafted during the polymerization in the presence thereof are utilizable as the substrate of the graft copolymer including conjugated 1,3-diene rubbers, ethylene-propylene-diene terpolymer rubbers, acrylate-diene interpolymer rubbers, and mixtures thereof. Although saturated rubbers may be grafted, it has been found desirable to include at least a small amount (at least 1.0 percent by weight) of a diene monomer component such as butadiene or hexadiene to facilitate grafting in ethylene/propylene and acrylate rubbers. This diene monomer component will normally comprise 1 to 20 percent by weight and preferably 2 to 8 percent by weight of the ethylene/propylene/diene terpolymer or acrylate copolymer rubber.

The preferred rubbers are diene rubbers or mixtures of diene rubbers, i.e., any rubbery polymers (a polymer having a second order transition temperature not higher than 0° C., preferably not higher than −20° C., as determined by ASTM Test D-746-52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers, such as monovinylidene aromatic hydrocarbons, (e.g., styrene; an aralkylstyrene, such as the o-, m-, and p-methylstyrenes, 2,4-dimethylstyrene, the arethylstyrenes, p-tertbutylstyrene, etc.; an alpha-alkyl-styrene, such as alpha-methylstyrene, alpha-ethylstyrene, alpha-methyl-p-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates, (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alphaolefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics. The crosslinking agent can by any of the agents conventionally employed for crosslinking diene rubbers, e.g., divinylbenzene, diallyl maleate, diallyl fumarate, diallyl adipate, allyl acrylate, allyl methacrylate diacrylates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

Another preferred group of rubbers are the stereo specific polybutadiene rubbers formed by the polymerization of 1,3 butadiene. These rubbers have a cis-isomer content of about 25–98 percent and a trans-isomer content of about 75–2 percent and generally contain at least about 85 percent of polybutadiene formed by 1,4 addition with no more than about 15 percent by 1,2 addition. Mooney viscosities of the rubber (ML-4, 212° F.) can range from about 20 to 70 with a second order transition temperature of from about −50°, to −105° C., as determined by ASTM Test D-746-52T.

Of the various techniques customarily employed for polymerizing rubber monomers including mass, mass-suspension and emulsion polymerization, emulsion polymerization is preferred since it will provide the particle size for which the present invention is most beneficially employed and may be used to produce a latex which is useful as the base for emulsion polymerization of the graft copolymer.

Graft Polymerization Process

The graft copolymer is prepared by polymerizing the monomer formulation in the presence of the preformed, rubber substrate, generally in accordance with conventional graft polymerization techniques. In graft polymerization, the preformed rubbery polymer substrate generally is admixed with the monomer and this admixture is polymerized to combine chemically or graft at least a portion of the polymer upon the rubber substrate. Depending upon the ratio of monomers to rubbery substrate and polymerization conditions, it is possible to produce both the desired degree of grafting of the polymer onto the rubbery substrate and the polymerization of ungrafted polymer to provide the desired amount of matrix polymer at the same time. Normally, the ratio of monomers to rubber charged to the graft polymerization reaction is the primary determinant of the superstrate:substrate ratio of the resultant graft copolymer. However, conditions of polymerization, rubber chemistry and particle size, rates of monomer addition, chain transfer agents, etc., also exert an effect.

The initiator or catalyst is generally included within the range of 0.01 to 2.0 percent by weight, and preferably on the order of 0.1 to 1.0 percent by weight of the polymerizable monomer, depending upon the monomers and the desired polymerization cycle. As will be discussed more fully hereinafter, the initiator may be added incrementally to facilitate optimum grafting.

It is significant that the grafting reaction is controlled to produce a graft superstrate having a molecular weight corresponding to an intrinsic viscosity of 0.35–0.60 as measured at 25° centigrade in dimethylformamide, since there is a strong correlation between polyblend properties and this value. Such control may be accomplished by temperature control alone during the grafting reaction; however, it is generally desirable to incorporate a conventional molecular weight regulator such as the mercaptans, i.e., normal alkyl mercaptans, e.g., n-dodecyl mercaptan, tertiary alkyl mercaptans, e.g., tertiary dedecyl mercaptan, halides and terpenes, e.g., terpinoline in relatively small percentages by weight. Normally, the combined effect of such regulators and temperature will be relied upon for molecular weight control. When used, the percentage of molecular weight regulator will be on the order of 0.001 to 2.5 percent by weight of the polymerizable monomer, depending upon the particular regulator involved. Thus, when n-dodecyl mercaptan is employed for this purpose about 0.5–2.0, and preferably 1.0–1.5 mole percent (based upon the monomer formulation) thereof, and a temperature of about 20° to 100° centigrade produce desirable results, and it has been observed that intrinsic viscosity decreases by about 0.05 dcl./g. as the mercaptan level increases. In addition, it may be desirable to include relatively small amounts of antioxidants or stabilizers such as the conventional alkylated phenols, although these may be added during or after polymerization.

In the preferred emulsion polymerization process, the monomer formulation and a rubber substrate latex are emulsified in water by use of a suitable emulsifying agent, such as a fatty acid soap, an alkali metal or ammonium soap of a high molecular weight alkyl or alkaryl sulfate or sulfonate, etc. Emulsifying agents which have proven particularly advantageous are sodium oleate, sodium palmitate, sodium stearate and other sodium soaps when operating at neutral to alkaline pH. Generally, the emulsifying agent is provided in total amounts of about 0.1 to 8.0 parts by weight per 100 parts by weight of the monomer formulation, and water is provided in an amount of about 1.0 to 4.0 parts per part of monomer formulation; even larger ratios may be employed where greater dilution is desired; preferably, the ratio is about 3:1. The aqueous latex formed in the emulsion polymerization of the rubber substrate may provide the aqueous medium into which the monomer formulation is incorporated, with or without additional emulsifying agents, water, etc. Alternatively, the substrate rubber may be dissolved in the monomer formulation and the mixture emulsified or a latex thereof may be separately prepared.

Various water-soluble free radical polymerization initiators are conventionally used for emulsion polymerization of the rubber monomers, including conventional peroxy and azo catalysts, and the resultant latex containing residual initator may be used as the aqueous medium with which the interpolymer monomers are admixed. In this matter, the initiator for the rubber polymerization may function in whole or in part as the initiator for the graft polymerization. However, additional initiator may be added at the time of graft polymerization. Exemplary of suitable peroxy catalysts are the alkali metal peroxides, persulfates, perborates, peracetates and percarbonates, and hydrogen peroxide; and if so desired may be activated to form a redox system. In addition, it may be advantageous to include an oil-soluble initiator such as di-tert-butyl peroxide, benzoyl peroxide, lauroyl peroxide, oleyl peroxide, toluyl peroxide, di-tert-butyl-diperphthalate, tert-butyl peracetate, tert-butyl perbenzoate, dicumyl peroxide, tert-butyl peroxide, isopropyl peroxy dicarbonate, 2,5-dimethyl-2,5-di(tert-butyl- peroxy)-hexane, 2,5-dimethyl-2,5-di(tert-butyl peroxy)-hexane-3, tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, 2,5-dimethyl-hexane-2,5-dihydroperoxide etc., or a mixture thereof. Moreover, other means of free-radical catalysis may be employed, such as actinic radiation.

The latex of the rubbery polymer and the monomer formulations is polymerized in an inert atmosphere at temperatures in the range of 20°–100° centigrade with agitation, and pressures of 0–100 p.s.i.g., may be employed. Polymerization is continued until at least 90 percent, of the monomers have been polymerized, and the cycle will normally range from 2–10 hours and preferably 4–8 hours.

The total amount of monomer formulation to be added will normally amount to 100–250 parts monomer per 100 parts total rubbery polymer, and preferably about 125–175 parts per 100 parts total rubbery polymer. The actual amount of monomer formulation added will be dependent upon the grafting efficiency of the reaction and the desired superstrate to substrate ratio for the graft copolymers formed. Although the entire amount of the monomer formulation may be present at the time that polymerization is commenced, generally it is preferable to add the monomer formulation either continuously or in increments over the major portion of the polymerization cycle, with at least some of the monomer formulation being added after the rubber latex has been introduced into the polymerizing mixture. For example, the monomer formulation may be added over approximately 1/3–5/6 of the total polymerization cycle and, although this addition may take the form of increments of varying size, the preferred technique utilizes substantially continuous addition at a relatively constant rate over 1/2–3/4 of the cycle. Normally, additional initiator is added incrementally or continuously over that portion of the cycle during which the monomer formulation is being added.

Particularly desirable control of an emulsion grafting reaction may be achieved in accordance with the method wherein there is admixed with the latex of the diene polymer, the polymerizable monovinylidene aromatic hydrocarbon monomer formulation, catalyst and a molecular weight regulator. The monomer is added to the latex over a period of at least 2 hours and at a rate to provide in the admixture not more than about 10 percent by weight, based upon the weight of the diene polymer, of unreacted monomer formulation at any time during the addition of the first 50 percent by weight of the monomer formulation. Similarly, the rate of addition is controlled during the addition of the last 50 percent by weight of the monomer so as to provide in the admixture not more than about 20 percent by weight of unreacted monomer at any time.

The catalyst is added to the latex in an amount and at rates sufficient to provide an excess of catalyst over the period of addition of at least the first 50 percent by weight of the monomer formulation and to provide catalyst for the polymerization of the monomer formulation throughout substantially the entire polymerization reaction. Since any significant excess of catalyst which will produce a residium of catalyst in the polymer is normally undesirable because of effect upon properties, the total amount of catalyst required to polymerize the monomer formulation to substantial completion is desirably determined initially. Normally, the addition of all the catalyst initially is not desirable, so that only 20 to 50 percent, and preferably 20 to 30 percent, of the total amount of catalyst is desirably charged either initially or during the addition of the first amounts of polymer. Then, additional catalyst is added during the addition of monomer formulation to ensure that the proportion of catalyst added is at least 10 percent greater, and preferably at least about 15 percent greater, than the proportion of monomer formulation added during at least the addition of the first 50 percent of the monomer formulation. For example, 25 percent of the catalyst may be added to the latex before addition of the monomer formulation, and increments of 10 to 15 percent are added during the addition of each 10 to 15 percent by weight of monomer formulation, so that at least 65 percent of the catalyst has been added by the time 50 percent of the monomer formulation has been added. It is considered important that there be an excess of catalyst during the initial half of the monomer addition to ensure favoring of the grafting reaction in such an approach.

The polymerization of the monomer formulation beyond 90 percent conversion is slow in that the concentration of monomers is low. Hence, many prior art processes distill the residual monomers from the latex rather than greatly extend the finishing polymerization cycles to reduce the residual monomer content of the polyblend. The distillation or stripping step, however, is costly in that the monovinylidene aromatic monomers are high boiling monomers, e.g., styrene boiling at 145° C., and are difficult to remove because of their high boiling point and their high solubility in the polyblend.

The present process provides for the addition of a third monomer to the polymerizable mixture after at least about 90 percent conversion of the monomer formulation which increases the monomer concentration, favoring high rates of polymerization. The third monomer is selected on the basis of being highly reactive with the monomer formulation including both the monovinylidene aromatic monomer and the ethylenically unsaturated nitrile monomer including the growing chains of said monomers, hence, readily forcing the monomer formulation to essentially complete conversion in relatively short finishing polymerization cycles. The third monomers are selected as those having a low boiling point below 120° C., preferably below 100° C., so that they are easily volatilized during the recovery of the polyblend from the polymerizable mixture, e.g., from a latex by coagulation, washing and drying.

The improved process of the present invention provides for essentially complete conversion, e.g., greater than 98 percent, of the monomer formulation particularly the high boiling monovinylidene aromatic monomers so that the polyblend has a low residual monomer content of this high boiling monomer. The ethylenically unsaturated nitrile monomer such as acrylonitrile is further polymerized as well. It copolymerizes with the monovinylidene monomer and the third monomer breaking up any long sequences of the nitrile monomer that can cause discoloration of the polyblend as the monomer formulation is forced to essential completion. Since the monovinylidene aromatic monomer has a high reactivity with the third monomer, the kinetics of polymerization favor the depletion of this monomer in the finishing step or final polymerization leaving only residual low boiling monomers to be removed readily during the recovery of the polyblend providing a polyblend having a low residual monomer content having high utility, e.g., in food packaging.

The third monomer is selected from the group consisting of vinyl acetate, acrylate esters, e.g., methyl acrylate, ethyl acrylate, methacrylate esters, e.g., methyl methacrylate, ethyl methacrylate, acrylic acid, methacrylic acid and mixtures thereof. Preferably, the present process uses vinyl acetate and/or methyl methacrylate as a third monomer. The third monomer is charged in step (B) after polymerizing at least about 90 percent of said monomer formulation preferably at least about 95 percent in an amount equivalent to at least about 50 percent by weight of the unpolymerized monomer formulation remaining in the polymerizable mixture, e.g., when the monomer formulation has reached 90 percent conversion then at least about 5 percent by weight, based on the monomer formulation, of a third monomer is charged in step (B). The third monomer can be added in an amount up to about 100 percent by weight of the unpolymerized monomer formulation. Amounts greater than 100 percent can be added in step (B) however, additional emulsifying agent must be used to insure emulsion stability. The present process has been found to reduce the residual monomer content of those monomers of the monomer formulation forming the polyblend, to less than about 1.0 percent by weight providing a polyblend of high utility particularly for food packaging. The residual monomers, such as styrene and acrylonitrile, in the ABS polyblend recovered from step (D) are determined by the gas chromatographic technique wherein 10 percent solutions of the ABS polyblend in dimethyl formamide are analyzed for the two monomers. The polymerized mixture can be analyzed at the end of step (C) by injecting a portion of said mixture into the gas chromatograph. Analysis at the end of step (C) for styrene and acrylonitrile type monomers determines the efficacy of step (C) in reducing the residual monomer content of the monomer formulation in the polymerizable mixture before coagulation, washing and drying.

The polymerizable mixture contains the residual unpolymerized monomer formulation plus the third monomer that are further polymerized in step (C) to essentially complete conversion, e.g., greater than 98 percent conversion of all monomers added to the polymerizable mixture followed by recovering the polyblend from said polymerizable mixture in step (D). The graft polymerization is preferably carried out by emulsion polymerization and the polyblend polymers are recovered by coagulation, washing and drying from the latex. The coagulation is carried out by procedures known in the art, e.g., through the addition of salts, e.g., magnesium sulfate or acids, e.g., acetic acid which is removed by washing. The latex may be dewatered by spray drying. The drying of the coagulated, filtered and washed polyblend can also be carried out in conventional equipment, e.g., fluid bed or rotary driers operating at 100° to 160° C., to insure the removal of the residual low boiling monomers and retained water.

The polymerization of the ABS polyblend can be carried out by the mass/suspension process wherein the diene rubber is dissolved in the monomer formulation and mass polymerized with stirring to a conversion sufficient to insure phase inversion of the grafted rubber copolymer phase in the matrix interpolymer phase followed by suspending the polymerizable mixture in an aqueous suspension and finishing the polymerization according to steps (B), (C) and (D). The ABS polyblend is recovered as beads from the suspension and dried. U.S.P. at No. 3,509,237 to N. E. Aubrey discloses one such suitable mass/suspension process for preparing ABS polyblends in Example 1, Part B.

Effect of Particle Size and Crosslinking

Particle size of the emulsion graft particles may be varied by seeding, emulsifying agent concentration, agitation, rubber size variation through agglomeration prior to grafting, coagulation techniques, etc. One of the most advantageous means for achieving the desired particle size rubber substrate is by controlled agglomeration using acidulation techniques as taught in Dalton U.S. Pat. No. 3,558,541.

Generally, the particle size of the rubber in the polymerizable monomers during the graft polymerization reactions has an effect upon the optimum grafting level for the low graft copolymer and to a lesser extend on the optimum grafting level for the high graft copolymer. As will be readily appreciated, a given weight percentage of smaller size rubber particles will provide considerably greater surface area for grafting than the equivalent weight of a larger size rubber particle. Accordingly, the density of grafting will be varied depending upon the size of the rubber particle. Generally, the smaller rubber particles will tolerate a higher superstrate/substrate ratio than the larger size particles to give generally comparable results.

To avoid any ambiguity which might be introduced by variation in particle size, the graft ratio is expressed in terms of weight of graft per square centimeter of the rubber surface. To determine the weight of graft per unit of surface area of the rubber substrate, the total area in square centimeters of 100 grams of rubber is first determined. Using the average diameter of the substrate as determined by number average and its density, the following formula is employed:

$$\text{Total area (sq. cm.)}(100 \text{ grams}) = \frac{(\text{area of particle}) \times 100}{(\text{volume of particle}) \times \text{density of particle}}$$

The weight of superstrate is determined for 100 grams of the graft copolymer by extracting the ungrafted matrix from a polymerization blend and substracting the weight of rubber charge.

The particle size of the rubber graft copolymer in the polyblend also has a significant effect upon the gloss and tensile properties; i.e., increasing particle size of the graft copolymer tends to adversely affect these properties. Moreover, if the particles are in excess of about 1.0 micron, the benefits of the present invention are materially reduced. Accordingly, the particle size of the graft copolymers may be varied from as little as 0.03 micron to as much as about 1.0 micron, depending upon the ultimate properties of the composition. However, the preferred compositions utilize graft copolymers having a particle size of about 0.05 to 0.4 micron, and desirably 0.08 to 0.3.

The particle size is the "weight average" particle size diameter of the rubber graft copolymer. This is the average diameter of a particle of average weight in a dispersion of the particles as determined with a photosedimentometer by the published procedure of Graves, M. J. et. al., "Size Analysis of Subsieve Powders Using a Centrifugal Photosedimentometer," British Chemical Engineering 9:742–744 (1964). A Model 3000 Particle Size Analyzer from Martin Sweets Company, 3131 West Market Street, Louisville, Ky. was used.

Although the rubber may be crosslinked, this may present problems from the standpoint of dissolving or dispersing the rubber for a suspension polymerization process. However, for emulsion polymerization processes, the rubber desirably has a significant degree of crosslinking.

With respect to the graft copolymers, at least some degree of crosslinking is inherent during the graft polymerization processes, and this desirably may be augmented through the addition of crosslinking agents or control of the polymerization conditions. By obtaining a highly crosslinked high graft copolymer, the discreteness of the graft copolymer particles is more readily maintained so as to obtain optimum efficacy therefrom.

Graft Ratio of the Copolymers

For rubber particles having a particle size diameter of about 0.05 to 0.3 microns a low graft copolymer has a grafting level which may vary within the range of about 0.7 to 5.0 $\times$ 10$^{-7}$ gram of superstrate per square centimeter of substrate. As the amount of graft per unit of surface area is decreased below 0.7 $\times$ 10$^{-7}$ gram there is an apparent tendency for the particles to agglomerate excessively and reduce the effectiveness of the present invention, as well as a noticeable decrease in other properties. As the amount of graft exceeds about $5.0 \times 10^{-7}$ gram, there is a noticeable reduction in impact strength and other properties of the compositions. The preferred compositions employ a graft level of about 1.4 to $2.8 \times 10^{-7}$ gram per square centimeter.

The graft level of a highly grafted copolymer may vary from as little as $7.0 \times 10^{-7}$ gram per square centimeter of substrate surface to as high as $35.0 \times 10^{-7}$ gram. The preferred compositions utilize a graft level of about 8.4 to $21.0 \times 10^{-7}$ gram. Reducing the graft level in the highly grafted polymer below about $7.0 \times 10^{-7}$ gram tends to reduce various of the physical properties. The upper limit of 35.0 is essentially determined by the degree of grafting which has been obtainable in conventional processes, although it is possible that a higher degree of grafting would function satisfactorily.

For agglomerated rubber particles ranging from about 0.35 to 0.70 microns. The preferred graft ratio for the graft copolymer will vary somewhat with the nature of the rubber substrate and the balance of properties ultimately desired. Generally, however, the most desirable graft copolymers have a graft density per square centimeter of rubber surface of about $25-45 \times 10^{-7}$ gram for the smaller range of 0.35–0.50 micron and of about $45-60 \times 10^{-7}$ gram for the larger range of 0.50–0.70 micron.

The Polymer Blend

As will be readily appreciated the rubber content of the polymer blend produced by the graft polymerization process of the present invention may be in excess of that desired for the final product since economics generally dictate the use of high rubber levels in the graft polymerization reaction. Accordingly, the graft polymerization blend resulting from the graft polymerization reaction will normally be blended with a vinylidene polymer of similar composition to increase the amount of matrix polymer and reduce the rubber level. This resinous polymer used for dilution of the graft copolymer may be produced by an emulsion process so that the latex thereof may be combined with the latex from an emulsion graft polymerization process and the mixed latex co-coagulated. Alternatively, the recovered graft copolymer may be admixed with a separately formed resinous polymer produced by emulsion, suspension or mass polymerization techniques. Generally, the final polymer blends will contain 2–50 percent by weight of the rubber component. The preferred blends contain about 7–35 percent by weight of the graft copolymer based upon rubber, and most desirably about 13–25 percent by weight thereof.

Illustrative of the efficacy of the present invention are the following specific examples, wherein all parts and percentages are by weight unless otherwise indicated.

EXAMPLE 1

Control

To 200 parts of a latex of a butadiene-acrylonitrile (93:7) copolymer rubber containing 50 percent solids are added 671 parts of water. The emulsion is heated to 86° C., with stirring followed by charging simultaneously (1) 170 parts of a monomer formulation of styrene and acrylonitrile (70:30) containing 1.0 part per hundred of monomer formulation (pphm) of tertiary dodecylmercaptan and (2) 0.8 parts of potassium persulfate in a 4.0 percent aqueous solution continuously over a period of 2.25 and 3.0 hours respectively. An add of Rubber Reserve Soap (0.5 parts in a 5% aqueous solution) is made after about 60 percent of the monomer formulation is charged followed by a second add (0.5 parts) after about 80 percent of the monomer formulation is charged. At the end of 2.25 hours the conversion of the monomer is about 94 percent and at the end of 3.0 hours the conversion was about 98.2 percent. The latex was cooled, coagulated by adding a 3 percent (weight) aqueous solution of magnesium sulfate, washed and dried with air at 155° C., and a polyblend temperature of about 80° C., recovering the ABS polyblend. The polyblend as contained in the latex before coagulation, washing and drying, was analyzed for residual monomer by a gas chromatograph and found to contain 1.1 percent styrene and 0.9 percent acrylonitrile monomers. The matrix interpolymer was found to have a number average molecular weight as determined by gel permeation chromatography of 38,000 and the superstrate to substrate weight ratio of the graft copolymer was 70 parts of superstrate interpolymer to 100 parts of rubber substrate or 70 parts per 100 of rubber (pphr), equivalent to about $15 \times 10^{-7}$ grams per square centimeter of surface.

EXAMPLES 2 – 4

Example 1 was repeated using the process of the present invention wherein a third monomer (vinyl acetate) was added at the end of the monomer addition or at about 2.25 hours and about 94 percent conversion of the monomer formulation. The reaction was continued terminating at about 3.0 hours with a final conversion of the monomer formulation to at least about 98 percent conversion. The formulations and test data are shown in Table 1.

TABLE 1

| Example | 1 | 2 | 3 | 4 |
|---|---|---|---|---|
| Vinyl Acetate[1] | 0 | 1.3 | 2.5 | 5.0 |
| Final Conversion (%)[2] | 98 | 98 | 98.5 | 99 |
| Residual Styrene %[3] | 1.1 | 1.0 | 1.0 | 0.6 |
| Residual Nitrile %[4] | 0.9 | 1.0 | 0.5 | 0.3 |

[1] Vinyl acetate shown as a percentage by weight of the monomer formulation.
[2] Final conversion of monomer formulation.
[3] Weight % residual styrene monomer in ABS polyblend as contained in latex.
[4] Weight % residual acrylonitrile monomer in ABS polyblend as contained in latex.

It is evident from the data that in Example 4 that the addition of the third monomer in an amount equivalent to at least about 50 percent of the unpolymerized monomer formulation reduced the monomer content to less than about 1.0 percent by weight of the ABS polyblend as polymerized before coagulating, washing and drying.

EXAMPLES 5 – 6

Example 2 was repeated using varying percentages by weight of methylmethacrylate as a third monomer. The formulations and test data was shown in Table 2.

TABLE 2

| Example | 1 | 5 | 6 |
|---|---|---|---|
| Methyl Methacrylate[1] | 0 | 5.0 | 10.0 |
| Final Conversion % | 98.0 | 99.3 | 99.5 |

TABLE 2-continued

| Example | 4 | 5 | 6 |
|---|---|---|---|
| Residual Styrene % | 1.0 | 0.40 | 0.25 |
| Residual Nitrile % | 0.9 | 0.30 | 0.25 |

[1]Methyl methacrylate added as a third monomer as a percentage by weight of the monomer formulation.

It is evident from the data that the third monomer was highly effective in moving the conversions of the monomer formulation to high final conversions wherein essentially all of the monomers of the monomer formulation are converted to interpolymer and only minor amounts are retained in the ABS polyblend after polymerization.

EXAMPLE 7

Fourteen parts of a soluble butadiene rubber were dissolved in 26.0 parts of acrylonitrile and 60.0 parts styrene. There were added thereto 0.07 part of a mixture of tert-butyl peracetate 0.05 part di-tert-butyl peroxide and stabilizers. The mixture was heated to 100° centigrade with stirring. Dodecyl mercaptan was added as a chain transfer agent over a period of approximately five hours in an amount of about 0.1 part per hour for approximately five hours, at the end of which time an additional 0.4 part was added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexyl acrylate which has a specific viscosity of about 4.0 as determined in a 1.0 percent solution in water at 25° centigrade. The resulting suspension was stirred and heated to polymerize the remaining monomer formulation to about 90 percent conversion. About 8.6 parts of methyl methacrylate monomer was added to the polymerizable mixture and the polymerization run an additional hour at 120° C., to a final conversion of about 99.4 percent conversion. The beads formed were filtered from the suspension and analyzed for residual styrene and acrylonitrile monomer and found to contain about 0.3 percent by weight residual styrene monomer and about 0.3 percent by weight of acrylonitrile. As a control the above experiment was repeated and the polymerization run for an additional hour after 90 percent conversion without the addition of a third monomer. A final conversion of about 98 percent of the monomer formulation as found, the beads containing about 1.2 percent by weight of residual styrene monomer and about 0.8 percent by weight of residual acrylonitrile monomer.

What is claimed:

1. In an improved process for preparing an ABS polyblend having a low residual monomer content, the steps comprising:
    A. polymerizing a polymerizable mixture comprising a monomer formulation, a molecular weight regulator and a prepolymerized graftable rubber containing a diene monomer component, to graft at least a portion of the polymerizing monomers as superstrate interpolymer on said rubber as a rubber substrate to provide a graft copolymer, said monomer formulation consisting essentially of from about 60 to 85 percent by weight of styrene and from about 15 to 40 percent by weight of acrylonitrile, forming during polymerization thereof, an ABS polyblend of said graft copolymer and a matrix interpolymer, the improvement comprising:
    B. charging a third monomer selected from the group consisting of vinyl acetate and methyl methacrylate and mixtures thereof to said polymerizable mixture in step (A) after polymerizing about 90 to 98% by weight of said monomer formulation, said third monomer being charged in an amount equivalent to about 2 to 10 percent by weight of the monomer formulation.
    C. further polymerizing said monomer formulation in the presence of said third monomer so as to convert essentially all of said monomer formulation to interpolymer, reducing said monomers of said monomer formulation to less than about 1.0% by weight as residual monomers in said interpolymer, and
    D. recovering said polyblend from said polymerizing mixture and drying said polyblend to remove essentially all residual monomers.

2. A process of claim 1, wherein said third monomer is methyl methacrylate.

3. A process of claim 1, wherein a molecular weight regulator selected from the group consisting of normal alkyl mercaptans and tertiary alkyl mercaptans or mixtures thereof, is present in said polymerizable mixture.

4. A process of claim 3, wherein said molecular weight regulator is n-dodecyl mercaptan.

5. A process of claim 3, wherein said molecular weight regulator is tert-dodecyl mercaptan.

6. A process of claim 3, wherein said molecular weight regulator is present in said polymerizable mixture in an amount of from about 0.001 to 2.5 percent by weight of said monomer formulation.

7. A process of claim 1, wherein a free radical generating catalyst is present in said polymerizable mixture during the polymerization thereof.

8. A process of claim 7, wherein said catalyst is present in an amount of from about 0.001 to 2.0 percent by weight of said monomer formulation.

9. A process of claim 7, wherein said catalyst is selected from the group consisting of water soluble and oil soluble catalysts and mixtures thereof.

10. A process of claim 9, wherein said water soluble catalyst is selected from the group consisting of alkali metal peroxides, persulfates, perborates, peracetates, percarbonates and hydrogen peroxide or mixtures thereof.

11. A process of claim 9, wherein said catalyst is activated forming a redox catalyst system.

12. A process of claim 10, wherein said catalyst is potassium persulfate.

13. A process of claim 10, wherein said catalyst is added to said polymerizable mixture continuously during the polymerization thereof in step (A).

14. A process of claim 10, wherein said catalyst is added to said polymerizable mixture incrementally with said monomer formulation.

15. A process of claim 1, wherein said polymerization of step (A) is carried out in an aqueous emulsion having said polymerizable mixture dispersed therein, said graftable diene rubber being dispersed as rubber particles having a weight average particle size diameter of from about 0.03 to 1.0 microns.

16. A process of claim 1, wherein the rubber substrate is a diene rubber polymer having at least about 75 percent by weight of a conjugated 1,3 diene monomer.

17. A process of claim 1, wherein said ABS polyblend formed has present about 10 to 50 percent by weight of said graft copolymer.

18. A process of claim 1, wherein said monovinylidene aromatic hydrocarbon and said ethylenically unsaturated nitrile comprises at least about 75 percent by weight of said monomer formulation.

19. A process of claim 1, wherein said monomer formulation has a weight ratio to said graftable rubber of from about 20–250:100 in said polymerizable mixture.

20. A process of claim 1, wherein said graft copolymer has about 0.7 to 70.0 × $10^{-7}$ grams of superstrate for square centimeter of substrate surface, said substrate rubber having a weight average particle size of from about 0.03 to 1.0 microns.

21. A process of claim 1, wherein said polymerization of step (A) is carried out by mass-suspension polymerization in combination with steps (B), (C) and (D).

* * * * *